(12) United States Patent
Aziz

(10) Patent No.: US 12,280,738 B1
(45) Date of Patent: Apr. 22, 2025

(54) TIRE LOCK SYSTEM AND METHOD OF USE

(71) Applicant: Kareem Sami Aziz, Euless, TX (US)

(72) Inventor: Kareem Sami Aziz, Euless, TX (US)

( * ) Notice: Subject to any disclaimer, the term of this patent is extended or adjusted under 35 U.S.C. 154(b) by 188 days.

(21) Appl. No.: 17/886,972

(22) Filed: Aug. 12, 2022

Related U.S. Application Data

(60) Provisional application No. 63/297,573, filed on Jan. 7, 2022.

(51) Int. Cl.
*B60R 25/09* (2013.01)

(52) U.S. Cl.
CPC .......... *B60R 25/096* (2013.01); *B60R 25/093* (2013.01)

(58) Field of Classification Search
CPC ....... B60R 25/00; B60R 25/09; B60R 25/093; B60R 25/096
USPC .......................................................... 70/225
See application file for complete search history.

(56) References Cited

U.S. PATENT DOCUMENTS

| | | | | |
|---|---|---|---|---|
| 5,247,815 A * | 9/1993 | Caldwell | ............... | B60R 25/093 70/226 |
| 8,777,511 B1 * | 7/2014 | Rose | ....................... | E01F 13/12 70/226 |
| 2005/0229476 A1 * | 10/2005 | Rom | ..................... | B60R 25/096 43/100 |
| 2007/0245783 A1 * | 10/2007 | Fulcher | ................. | B60R 25/093 70/226 |
| 2011/0226022 A1 * | 9/2011 | Caldwell | ............... | B60R 25/096 70/19 |

* cited by examiner

*Primary Examiner* — Nathan Cumar
(74) *Attorney, Agent, or Firm* — Leavitt Eldredge Law Firm; Richard Eldredge

(57) ABSTRACT

A tire lock system prevents the movement of a trailer or vehicle once attached. A clamshell-style arms are attached to the inside and outside of a tire. Spikes on the arms are placed so that if the tire is rotated the spikes puncture the tire. The arms are reinforced and strengthen to prevent cutting, pulling, removal, or damage to the arms. The arms are held in place by a lock that is unique to each so that removal requires a special tool.

2 Claims, 5 Drawing Sheets

TIRE LOCK SYSTEM AND METHOD OF USE

BACKGROUND

1. Field of the Invention

The present invention relates generally to security systems and methods, and more specifically, to a tire lock system that prevents the use of a trailer when placed around a set of its tires by spikes that will puncture the tires if they are rolled over the invention and is strong enough to withstand abuse and attempts to remove it by force.

2. Description of Related Art

Security systems are well known in the art and are effective means to protect property and persons from misuse, abuse, theft, and the like. Common security systems include boots or wheel locks that are placed on a tire of a vehicle to prevent it from moving. These boots are used when a vehicle is parked where it should not be or to prevent the theft of the vehicle. Commonly, a large bar is secured under the tire by a mechanism that secures to the rim of the tire. With the large bar under the tire, it is difficult for the tire to rotate, and this restricts the movement of the vehicle.

One of the problems associated with common tire lock systems is their limited efficiency. For example, while the large bar restricts the rotation of the tire it does not prevent it. With the boot attached the vehicle still operates and with enough force the tire will rotate with the boot in place, this will damage the vehicle, but it will move. When the vehicle moves with the boot attached the boot ceases to perform the function of its placement. While damage is caused the vehicle still moved. With larger vehicles, the large bar of the boot may not cause damage or present a deterrent to movement. These large vehicles must then be controlled or protected through other means.

Accordingly, although great strides have been made in the area of security systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
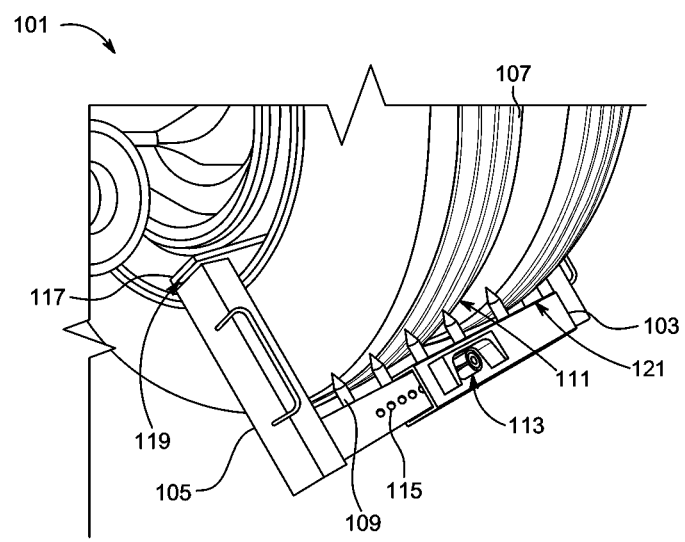
FIG. 1 is an inside view of a tire lock system in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional security systems. Specifically, the present invention restricts the movement of a trailer by the destruction of the tires if the tire rotates over spikes attached to the large bar. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts an inside view of a tire lock system in accordance with a preferred embodiment of the present application. It will be appreciated that system 101 overcomes one or more of the above-listed problems commonly associated with conventional security systems.

In the contemplated embodiment, system 101 includes an outer beam 103 slidingly attached to an inner beam 105 so that the inner beam 105 enters the outer beam and is held in place by a lock 113 that engages with holes 115. The lock 113 is attached to the outer beam 103 and the holes 115 pass through the inner beam 105. The outer beam 103 and inner beam 105 have spikes 109 attached to the tire side surface 121 thereof. Each beam has a wheel lock 117 attached to the top end 119 of the beams. It is contemplated that the wheel lock 117 could be adjustable in length and have a brace that attached to it and the respective beam.

It is contemplated that the strength of the system directly affects the usefulness thereof. Braces, angle supports, material size and thickness all contribute to the strength thereof. For example, braces attached to the beams and their cross members increase the strength against bending and sawing.

Figure 2:
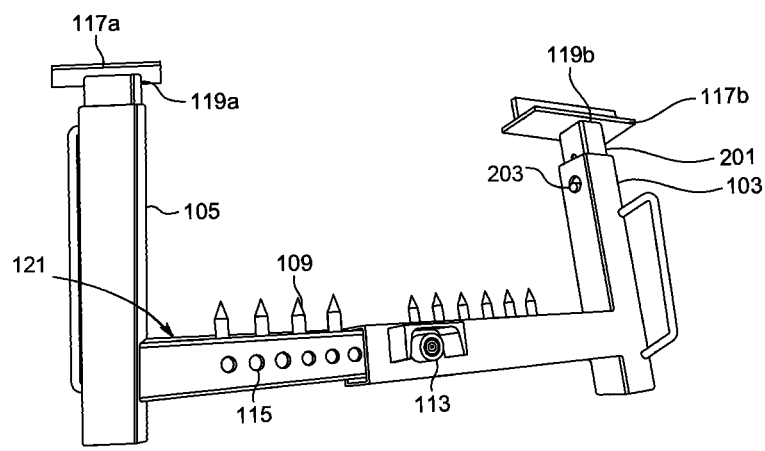
FIG. 2 is a top view of the system of FIG. 1.

Referring to FIG. 2, the wheel locks 117 of the outer beam 103 and inner beam 105 are securely attached to adjustment bars 201 that slidingly attach to the top end 119 of the beams to allow the system 101 to attach to a range of tire 107 sizes. In the preferred embodiment, the wheel locks 117 are welded to the adjustment bars 201. The adjustment bars 201 are held in place at the selected length by a locking nut 203. The locking nut 203 has a unique 'T' pattern that requires a specific tool to place or remove it. It is contemplated that this locking nut 203 could also replace the lock 113.

In use, the outer beam 103 is placed in the rim of the wheel on the outside of the tire 107 and the inner beam 105 is placed in the rim of the wheel on the inside of the tire 107 and both are held in place by their wheel locks 117. The outer beam 103 and inner beam 105 are placed so that the spikes 109 are against the friction surface 111 of the tires 107. The outer beam 103 and inner beam 105 are secured together via the lock 113 and holes 115. Should the tire rotate the spikes 109 puncture the tires 107 and prevent the vehicles to which they are attached from moving.

It should be appreciated that one of the unique features believed characteristic of the present application is that the spikes 109, if rotated into the tire 107 after their placement destroy the tires 107 so that the trailer or vehicle cannot move. This enforces the restriction on the movement of the trailer or vehicle.

Figure 3:
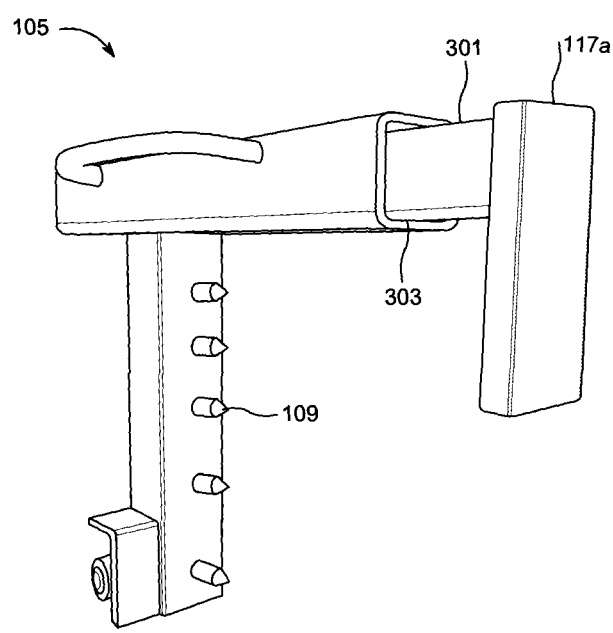
FIG. 3 is a perspective view of the inner beam of FIG. 1.
Figure 4:
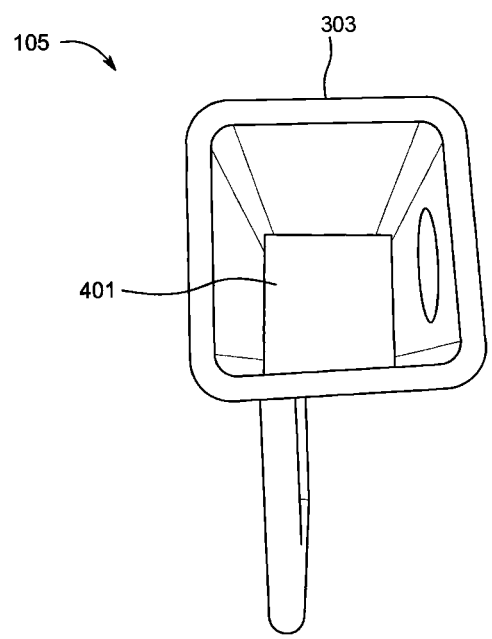
FIG. 4 is a top view of the inner beam of FIG. 3.

Referring to FIGS. 3 and 4 the inner beam 105 is depicted and includes a beam 301 that is attached to the wheel lock 117 and slides in a tube 303 that is part of the inner beam 105. The tube 303 has a solid bar 401 is attached therein. The beam 301 slides in the tube 303 to adjust the length of the wheel lock 117 to accommodate the attachment of the inner beam 105 or similarly to the outer beam 103 to large or small tires.

Figure 5:
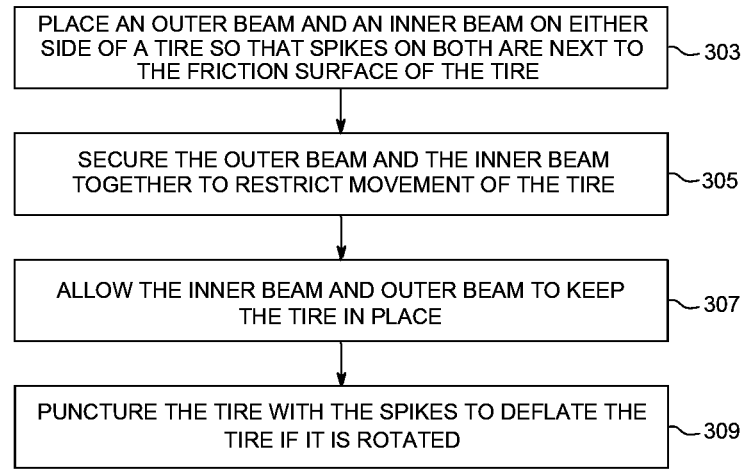
FIG. 5 is a flowchart of a method of securing a trailer or vehicle with large tires.

Referring now to FIG. 5 a method of securing a trailer or vehicle with large tires is depicted. Method 501 includes placing an outer beam and an inner beam on either side of a tire so that spikes on both are next to the friction surface of the tire 503, securing the outer beam and inner beam together to restrict movement of the tire 505, allowing the inner beam and outer beam to keep the tire in place 507, or if rotated puncturing the tires with the spikes to deflate the tires 509.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A tire lock that engage with a tire system comprising:
   an outer beam slidingly attached to an inner beam, the inner beam having a plurality of holes;
   a first wheel lock attached to the outer beam and a second wheel lock attached to the inner beam, the first wheel lock and the second wheel lock are configured to engage with a rim of the tire;
   a lock attached to the outer beam and is configured to engage with the plurality of holes of the inner beam;
   a plurality of spikes extending from and attached to both the inner beam and the outer beam;
   wherein the plurality of spikes are directed towards the tire as the inner beam and the outer beam are in a locked position.

2. A method of securing a trailer or vehicle with large tires, comprising:
   providing the system of claim 1;
   placing the outer beam and the inner beam on either side of the tire so that the plurality of spikes are directed towards of the tire;
   securing the outer beam and inner beam together via the lock;
   puncturing the tire with the plurality of spikes if the tire rotates.

* * * * *